Patented July 5, 1927.

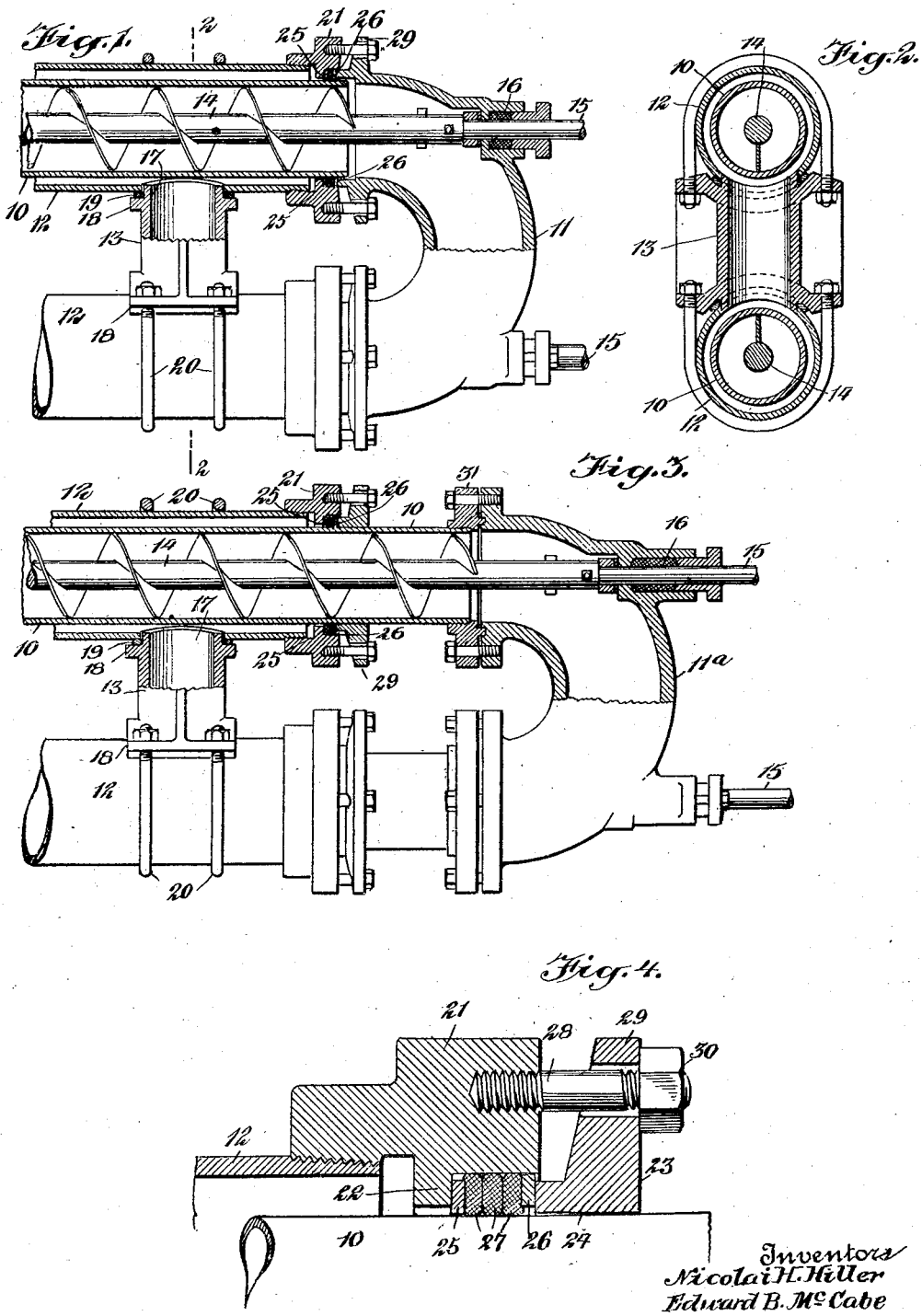

1,634,714

UNITED STATES PATENT OFFICE.

NICOLAI H. HILLER AND EDWARD B. McCABE, OF CARBONDALE, PENNSYLVANIA, ASSIGNORS TO CARBONDALE MACHINE COMPANY, OF CARBONDALE, PENNSYLVANIA, A CORPORATION OF PENNSYLVANIA.

HEAT INTERCHANGER.

Application filed February 6, 1925. Serial No. 7,220.

This invention relates to counter-current heat interchangers of the zigzag concentric tube type, and relates more particularly to the means employed for connecting the inner and outer pipes in series to form the two continuous conduits.

Although the invention, broadly considered, is not limited to a type in which screw conveyors are used in the inner tubes, certain features have special advantages when employed in that type, where bending of the inner tube would cause binding of the screw conveyor or its bearings.

The main objects of the invention are to reduce the cost of manufacture and assembly of the parts and to provide simple and effective means for preventing leakage at the joints.

To accomplish these objects there is provided as one important feature of our invention, a very simple form of connection between the outer pipes, which is so designed and connected as to require little or no machining or finishing operation. This connection is preferably in the form of a double saddle disposed between two adjacent outer pipes and connected to both of them by stirrup bolts extending around the tubes, and packings encircling openings cut in the sides of the tubes. The tightening of the packing by tightening the stirrup bolts results in drawing the outer tubes toward each other. For that reason such a double saddle could not be used with the usual stuffing box around the inner tubes, and the usual return bends connecting the inner tubes in series.

To permit of the lateral movement of the outer tubes in the tightening of the packings at the ends of the double saddles, we provide as a further important feature of our invention, a special form of stuffing box which permits the floating of the outer tubes in respect to the inner tubes. Thus the inner tubes with their return bends form a rigid support on which the outer tubes have limited lateral movement to permit tightening of the packing at the ends of the double saddle, and without disturbing the packing around the inner tubes. This lateral bodily movement does not bend or move the inner tubes or disturb the mounting or operation of any conveyors which may be employed therein.

In the accompanying drawings there are illustrated two forms which the invention may assume, but it will be obvious that certain of the structural details may be varied without departing from the scope of our invention.

In these drawings:

Fig. 1 is a side elevation of a portion of a heat interchanger constructed in accordance with our invention, certain of the parts being shown in section.

Fig. 2 is a transverse section on the line 2—2 of Fig. 1.

Fig. 3 is a view similar to Fig. 1, but showing the gland nut and return bend formed as separate parts, and Fig. 4 is an enlarged sectional detail of the stuffing box.

In the constructions illustrated a continuous passage for one fluid is formed by a plurality of parallel inner tubes 10 connected together in series by return bends 11, and a continuous passage for a second fluid is formed by a plurality of tubes 12 arranged concentric with the inner tubes 10 and connected together in series at opposite ends by connecting members 13.

If the apparatus is to be used for cooling a fluid from which solid matter may separate during the cooling action, there is provided a screw conveyor in each inner tube, the shafts 15 of the conveyors extending through stuffing boxes 16 in the return bends 11. There appears to be no necessity for illustrating the entire heat interchanger or the mechanism for operating the screw conveyors, as the general arrangement may be substantially as shown in the Hiller Patent 922,898, dated May 25, 1909.

The connecting member 13 forms one important feature of our invention. As shown this member is in the form of a double saddle with terminal portions 17 adapted to register with or extend into openings in the sides of the outer tubes, and annular flanges 18 curved to follow the contour of the adjacent wall of the outer tube and hold a packing 19 in place between the connecting member and the tube. The flange 18 also serves to receive the terminals of U or saddle bolts 20 encircling the tubes. It will be apparent that by tightening the nuts on these bolts the gaskets 19 are compressed, and as a result the distance between the centers of the two tubes 12 is varied. In ordinary constructions this is objectionable or impossible due to the construction of the stuffing boxes around the inner tubes and the return bends connecting said tubes. By means of our improved construction of stuffing boxes this lateral or floating movement of the outer tubes is permissible.

Our improved stuffing box includes a collar 21 which is connected by screw threads, welding, or other suitable means to the outer tube. This collar has an inwardly extending flange 22 forming a packing seat and having an internal diameter somewhat larger than the outside diameter of the inner tube 10. This difference in diameter is approximately equal to the maximum range of compression or difference in thickness of the gasket 19.

In connection with the stuffing boxes there is provided a gland 23 having a close fit on the inner tube, and having a packing compressing flange part 24 adapted to enter the stuffing box, but with its outside diameter somewhat smaller than the inside diameter of the packing receiving chamber of the stuffing box.

Within the stuffing box, that is, between the flanges 22 and 24, there are provided a pair of steel rings 25 and 26, the former of which engages with the flange 22 and closely fits the inner tube. The outside diameter is approximately the same as the outside diameter of the flange 24. The other ring 26 has its outside diameter fitting the wall of the stuffing box, while its inside diameter is approximately the same as that of the flange 22. Between these two rings there are provided compressible packing members 27.

For moving the gland 23 endwise to tighten the packing, the stuffing box is provided with stud bolts 28 projecting through apertures in the flange 29 of the gland, and receiving nuts 30. The apertures of the flange 29 are enough larger than the bolts so as to permit the desired amount of lateral movement of the glands in respect to the stuffing box.

The glands 23 are thus directly carried by and supported on the inner tubes but permit a lateral or radial movement of the stuffing boxes and outer tubes. The glands may be made integral with or independent of the return bends. In Fig. 1 we have shown the return bends 11 formed integral with the glands. In this construction the packings 27 serve not only to prevent leakage from the ends of the outer tubes, but also to prevent leakage along the outer surface of the inner tubes from the outer tubes to the return bends of the inner tubes. This construction is suitable where the same fluid is flowing in the outer conduit as in the inner conduit. For instance the apparatus may serve as a heat interchanger for liquid passing to and from a chilling apparatus, a sterilizer or other apparatus for heat treatment. In such a construction slight leakage past the stuffing box from one conduit to the other is not of any particular moment.

Where it is highly important that the two liquids do not come in direct contact with each other the return bends may be made independent of the glands, as shown in Fig. 3. Here the inner tubes 10 are made somewhat longer and provided with flanges 31 welded, threaded or otherwise secured or formed thereon, and to which the return bends 11ª are bolted or otherwise rigidly secured. The return bends in both forms serve to definitely space and position the inner tubes and to connect them together in series, but they do not prevent the limited lateral or floating movement of the outer tubes to permit tightening of the packings at the ends of the double saddle.

Having thus described our invention, what we claim as new and desire to secure by Letters Patent is:—

1. In combination, a pair of inner tubes, a return bend connecting said tubes together in series with fixed centers, a pair of outer tubes, stuffing boxes at the ends of said outer tubes, encircling said inner tubes, and permitting limited lateral movement of each outer tube in respect to its inner tube, each of said outer tubes having an opening in the side thereof, and a connecting member registering with said openings.

2. In combination, a pair of inner tubes, a return bend connecting said tubes together in series with fixed centers, a pair of outer tubes, stuffing boxes at the ends of said outer tubes, encircling said inner tubes spaced from and independent of said return bend, and permitting limited lateral movement of each outer tube in respect to its inner tube, each of said outer tubes having an opening in the side thereof, a connecting member registering with said openings, and means for drawing said outer tubes toward each other to effect a tight joint at the ends of said connecting member.

3. In combination, a pair of inner tubes, a return bend connecting said tubes together in series with fixed centers, a pair of outer tubes, and stuffing boxes at the ends of said outer tubes, encircling said inner tubes spaced from and independent of said return bend and permitting limited lateral movement of each outer tube in respect to its inner tube.

4. In combination, a pair of inner tubes, a return bend connecting said tubes together in series with fixed centers, a pair of outer tubes, stuffing boxes at the ends of said outer tubes, encircling said inner tubes and permitting limited lateral movement of each outer tube in respect to its inner tube, a connecting member disposed between said outer tubes, and means for drawing said outer tubes together to effect tight joints at the ends of said connecting member.

5. In combination a pair of outer tubes, each having an opening in the side thereof, a connecting member having its ends registering with said openings, and having portions seating on the outer surfaces of said tubes, retainer members secured to said connecting member and extending around said tubes, inner tubes within said outer tubes, and means connecting said inner tubes and holding them spaced at a fixed distance.

6. In combination a pair of outer tubes each having an opening in the side thereof, gaskets encircling said openings, a tubular connecting member having saddles at its ends engaging with said gaskets and encircling said openings, and means for securing said outer tubes in said saddles.

7. In combination a pair of outer tubes each having an opening in the side thereof, gaskets encircling said openings, a tubular connecting member having saddles at its ends engaging with said gaskets and encircling said openings, and stirrup bolts encircling said outer tubes and securing the latter to said saddles.

8. In combination a pair of outer tubes each having an opening in the side thereof, gaskets encircling said openings, a tubular connecting member having saddles at its ends engaging with said gaskets and encircling said openings, a pair of inner tubes, means for connecting the latter and holding them in predetermined spaced relationship, and means for holding said outer tubes in said saddles at varying spaced relationship.

9. In combination, a pair of outer tubes each having an opening in the side thereof, a connecting member having its ends registering with said openings, inner tubes within said outer tubes, stuffing boxes at the ends of said outer tubes and encircling said outer tubes and permitting limited movement of the outer tubes, and a return bend connecting said inner tubes and holding them in predetermined spaced relationship.

10. In combination a pair of outer tubes, inner tubes disposed therein, a return bend connecting said inner tubes and holding them with fixed centers, a double saddle connecting member between said outer tubes and stuffing boxes at the ends of said outer tubes, and encircling said inner tubes and permitting relative movement of said outer tubes upon the clamping of the latter to said saddles.

Signed at Carbondale in the county of Lackawanna and State of Pennsylvania this 19th day of January 1925.

NICOLAI H. HILLER.
EDWARD B. McCABE.